US011451718B1

(12) United States Patent
Nguyen

(10) Patent No.: US 11,451,718 B1
(45) Date of Patent: Sep. 20, 2022

(54) DETECTING FLICKER BANDS USING MULTI-EXPOSURE SENSORS

(71) Applicant: NVIDIA Corporation, Santa Clara, CA (US)

(72) Inventor: Hugh Phu Nguyen, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/199,797

(22) Filed: Mar. 12, 2021

(51) Int. Cl.
*H04N 5/235* (2006.01)
*H04N 5/353* (2011.01)

(52) U.S. Cl.
CPC ......... *H04N 5/2357* (2013.01); *H04N 5/3532* (2013.01)

(58) Field of Classification Search
CPC .......................... H04N 5/2357; H04N 5/3532
See application file for complete search history.

(56) References Cited

U.S. PATENT DOCUMENTS

| 9,432,590 | B2 | 8/2016 | Nguyen et al. | |
|---|---|---|---|---|
| 2011/0255786 | A1* | 10/2011 | Hunter | H04N 5/21 382/190 |
| 2017/0150030 | A1* | 5/2017 | Nakamura | H04N 5/2357 |
| 2019/0208106 | A1* | 7/2019 | Lukac | G06T 5/30 |

OTHER PUBLICATIONS

Yoo, Y., Im, J., & Paik, J. (2014). Flicker removal for CMOS wide dynamic range imaging based on alternating current component analysis. IEEE Transactions on Consumer Electronics, 60(3), 294-301.
Gu, J., Hitomi, Y., Mitsunaga, T., & Nayar, S. (Mar. 2010). Coded rolling shutter photography: Flexible space-time sampling. In 2010 IEEE International Conference on Computational Photography (ICCP) (pp. 1-8). IEEE.

* cited by examiner

*Primary Examiner* — Twyler L Haskins
*Assistant Examiner* — Angel L Garces-Rivera
(74) *Attorney, Agent, or Firm* — Taylor English Duma LLP

(57) ABSTRACT

Alternating Current (AC) light sources can cause images captured using a rolling shutter to include alternating darker and brighter regions—known as flicker bands—due to some sensor rows being exposed to different intensities of light than others. Flicker bands may be compensated for by extracting them from images that are captured using exposures that at least partially overlap in time. Due to the overlap, the images may be subtracted from each other so that scene content substantially cancels out, leaving behind flicker bands. The images may be for a same frame captured by at least one sensor, such as different exposures for a frame. For example, the images used to extract flicker bands may be captured using different exposure times that share a common start time, such as using a multi-exposure sensor where light values are read out at different times during light integration. Two or more images captured for a frame may be used for flicker band extraction, such as the two images that include flicker bands with the greatest phase difference.

20 Claims, 10 Drawing Sheets

DETECTING FLICKER BANDS USING MULTI-EXPOSURE SENSORS

BACKGROUND

A rolling shutter sensor may be used to capture light for an image by scanning across a scene—either vertically or horizontally—to expose different rows of the sensor to the light over time. When the scene includes a light source that changes in intensity over the time in which the light is captured—such as a 50 (Hertz) Hz or 60 Hz Alternating Current (AC) light source—some rows may be exposed to different intensities of the light than others. This disparity in light intensity can result in flicker banding, where the image includes alternating bands of lighter and darker regions, or other visual artifacts. Flicker banding may be compensated for by extracting flicker bands from images, determining the oscillating frequency of the light source (e.g., 50 or 60 Hz AC) from the extracted flicker bands, and setting the sensor exposure time to be a multiple of one-half the oscillating frequency.

A conventional approach to extracting flicker bands includes subtracting two consecutive frames from each other. If the scene content does not change among the two frames, then the content will be canceled out while leaving flicker bands that result from subtracting flicker bands of each frame, which typically appear at different locations in the two frames. However, if the scene does change among the two frames, the subtracted result will include the content mixed in with the flicker bands, making flicker band detection difficult. Additionally, if the two frames are captured at certain frame rates, flicker bands from the two frames will be in-phase so that they cancel out and the subtracted result does not include any indication that the individual frames include flicker bands. Thus, the flicker bands may go undetected and while being present in images produced by the sensor.

SUMMARY

Embodiments of the present disclosure relate to flicker band extraction for multi-exposure sensors. Systems and methods are disclosed that provide for extracting data that captures flicker bands from images that is less-likely to include residual content from a scene and can more readily be used to derive an oscillation frequency of one or more light sources that caused the flicker bands.

In contrast to traditional approaches to flicker band extraction, images used to extract flicker bands may be captured using exposures that at least partially overlap in time. In subtracting the images from each other scene content substantially cancels out, leaving behind flicker bands. In at least one embodiment, the images may be for a same frame captured by at least one sensor. For example, the images may comprise multiple exposures that the at least one sensor captures in a frame. In one or more embodiments, the images used to extract flicker bands may be captured using different exposure times that share a common start time, such as using a multi-exposure sensor where light values are read out at different times during light integration. Two or more of the images may be used for flicker band extraction, such as images that include flicker bands with the greatest phase difference.

BRIEF DESCRIPTION OF THE DRAWINGS

The present systems and methods are described in detail below with reference to the attached drawing figures, wherein.

DETAILED DESCRIPTION

Figure 1:
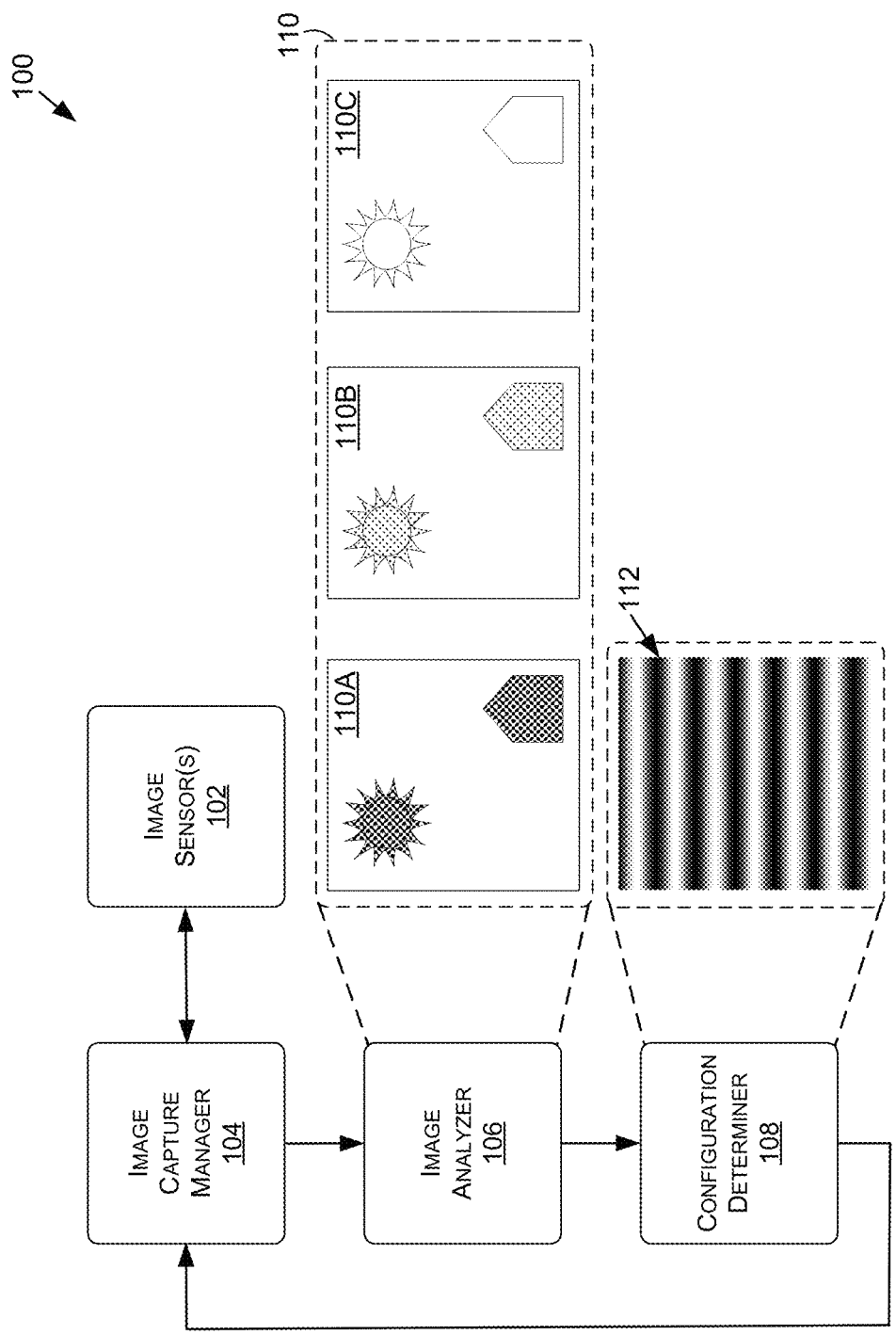
FIG. 1 is a data flow diagram illustrating an example of a system performing a process for compensating for flicker bands in images, in accordance with some embodiments of the present disclosure.

Embodiments of the present disclosure relate to flicker band extraction for multi-exposure sensors. Systems and methods are disclosed that provide for extracting data that captures flicker bands from images that is less-likely to include residual content from a scene and can more readily be used to derive an oscillation frequency of one or more light sources that caused the flicker bands.

Although the present disclosure may be described with respect to an example autonomous vehicle 400 (alternatively referred to herein as "vehicle 400" or "ego-vehicle 400," an example of which is described herein with respect to FIG. 4B), this is not intended to be limiting. For example, the systems and methods described herein may be used by non-autonomous vehicles, semi-autonomous vehicles (e.g., in adaptive driver assistance systems (ADAS)), vehicles in combination with trailers, piloted and un-piloted robots or robotic platforms, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting. For example, the systems and methods described herein may be used in robotics, consumer electronics (e.g., camera of mobile phones), aerial systems, boating systems, and/or other technology areas that may leverage one or more cameras that are susceptible to flicker banding.

In contrast to traditional approaches to flicker band extraction, the images used to extract flicker bands may be captured using exposures that at least partially overlap in time. Thus, scene content captured by each image is more likely to be similar, resulting in the flicker bands being more readily distinguished from other image content. For example, in subtracting the images from each other the scene content substantially cancels out, leaving behind flicker bands. In at least one embodiment, the images may be for a same frame captured by at least one sensor. For example, the images may comprise multiple exposures that the at least one sensor captures in a frame. In further contrast to traditional approaches to flicker band extraction, the images used to extract flicker bands may be captured using exposures that occur for different amounts of time. As a result, the flicker bands of each image are more likely to be out of phase, even where the images are captured over time periods that at least partially overlap.

In one or more embodiments, the images used to extract flicker bands may be captured using different exposure times that share a common start time, such as using a multi-exposure sensor where light values are read out at different times during light integration. For example, light values may be read out from the multi-exposure sensor to generate a low exposure image of a frame, later read out to generate a medium exposure image of the frame, then even later read out to generate a high exposure image of the frame. Two or more of the images may be used for flicker band extraction, such as images that include flicker bands with the greatest phase difference.

With reference to FIG. 1, FIG. 1 is a data flow diagram illustrating an example of a system 100 performing a process for compensating for flicker bands in images, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may include, amongst other components, one or more image sensors 102, an image capture manager 104, an image analyzer 106, and a configuration determiner 108. As an overview, the image sensor(s) 102 may comprise one or more image sensors capable of capturing images that include flicker bands produced by one or more light sources. The image capture manager 104 may be configured to manage or control the image sensor(s) 102 and/or other components (e.g., camera components) that impact the capture of the images by controlling such camera parameters as those that impact exposure time, frame rate, brightness, aperture, focal length, ISO speed, etc. Examples of the images includes images 110A, 110B, and 110C (also referred to as "images 110"). The image analyzer 106 may be configured to analyze the images captured using the image sensor(s) 102, for example, to select one or more of the images for use in extracting flicker band data and/or for extracting flicker band data from the one or more images. For example, the image analyzer 106 may extract flicker band data representative of other otherwise corresponding to flicker bands 112 from two or more of the images 110.

The configuration determiner 108 may be configured to determine a configuration of at least one sensor, such as one or more of the image sensors 102 based on the flicker bands 112. The configuration may be determined to reduce or eliminate flicker bands from future images or otherwise compensate for a light source(s) that may produce the flicker bands. For example, the configuration may be used to capture one or more images using the at least one sensor. In the example shown, the image capture manager 104 (and/or an image capture manager associated with one or more other sensors) may use the configuration to capture the one or more images (e.g., using the one or more image sensors 102 or one or more different sensors).

As described herein, the image capture manager 104 may be configured to manage or control the image sensor(s) 102 and/or other components (e.g., camera components) that impact the capture of the images. Image data of an image, such as the image 110A, 110B, or 110C, may represent a set of values for pixels for a given exposure of the image sensor 102 or a set of aggregated values from multiple exposures. The values may correspond to or indicate light brightness or intensity in a scene and may or may not correspond to or indicate color information. Further, image data of an image may correspond to full or partial data read out from the image sensor 102 (e.g., one or more rows and/or portions thereof) and may be in a raw, pre-processed, or processed format.

By way of example and not limitation, the image capture manager 104 may be implemented by hardware and/or software (e.g., firmware) of a camera device(s) that includes the image sensor(s) 102. The image sensors 102 may comprise one or more rolling shutter sensors, for example, a rolling shutter Complementary Metal Oxide Semiconductor (CMOS) sensor. A rolling shutter sensor may refer to an image sensor that is capable of capturing one or more images using a rolling shutter capture. A rolling shutter capture may capture light for an image(s) by scanning across a scene—either vertically or horizontally—to expose different rows of the sensor to light over time. This is in contrast to global shutter capture, where all rows are exposed at the same time.

For a single frame, the image capture manager 104 may use the image sensor(s) to capture any number of images, such as a single image or multiple images. For multiple images, one or more of the images may be combined, aggregated, selected from, and/or otherwise used by the image capture manager 104 may use to generate a frame. In one or more embodiments, an image sensor 102 may be used as a single exposure sensor. A single exposure sensor may be exposed to light for a period of time, and light values for pixels may be read out and used by the image capture manager 104 to generate an image for a frame (e.g., the image 110A, 110B, or 110C). However, in one or more embodiments, an image sensor 102 may be used as a multi-exposure sensor. A multi-exposure sensor may be exposed to light for multiple periods of time, and light values for pixels may be read out multiple times for a frame and used by the image capture manager 104 to generate an image for each period of time that are used to generate a frame. For example, the image 110A may correspond to a first period of time, the image 110B may correspond to a second period of time, and the image 110C may correspond to a third period of time.

In one or more embodiments, for a multi-exposure sensor, light integration may continue across the periods of time. For example, the light integration may not be reset through read-outs for each of the images 110. Thus, the image 110A may comprise a low exposure image, the image 110B may comprise a medium exposure image, and the image 110C may comprise a high exposure image. While three images 110 are shown, the images 110 may include more or fewer images. In this regard, the exposure used to generate the image 110B may overlap with the exposure used to generate the image 110A, and the exposure used to generate the image 110C may overlap with the other exposures. The multi-exposure sensor may be a High Dynamic Range (HDR) sensor and the images may be used to generate an HDR frame.

Figure 2:
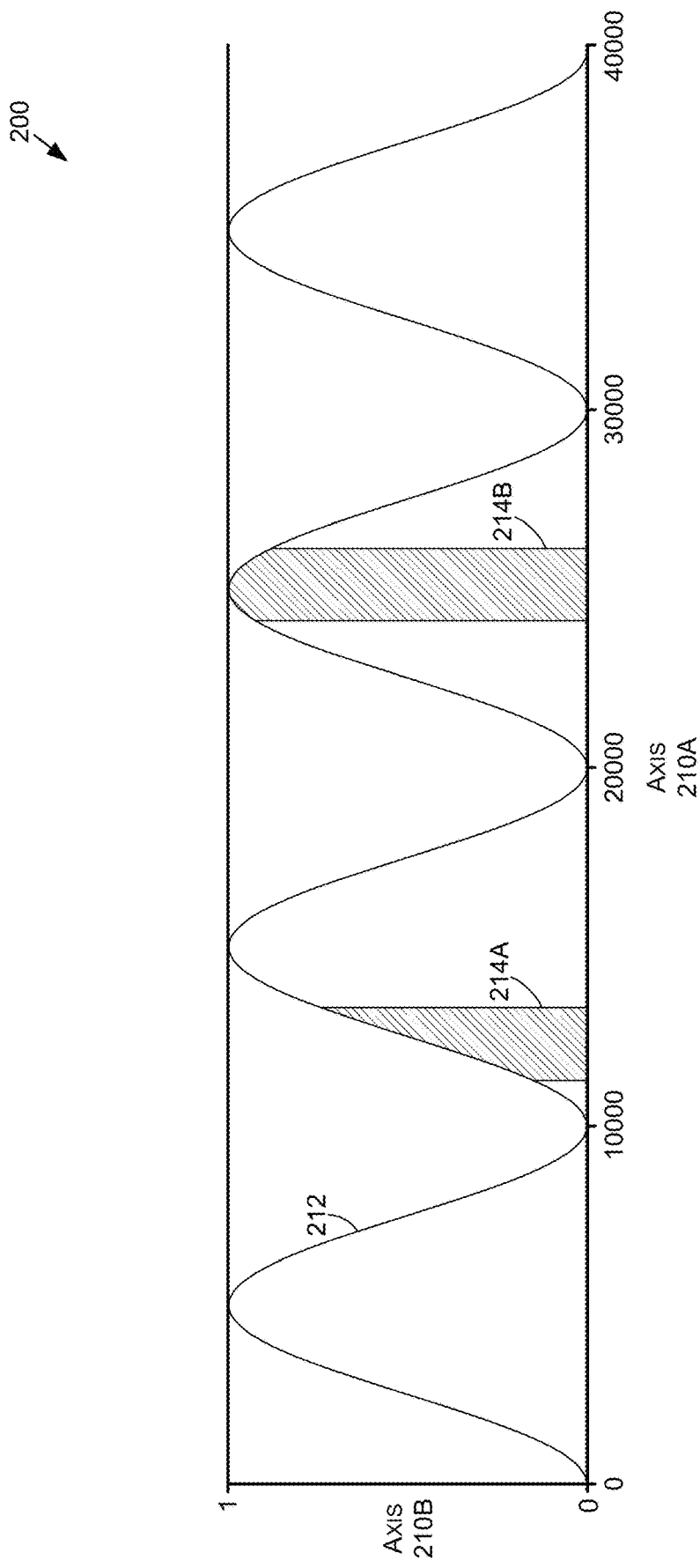
FIG. 2 includes an example graph used to illustrate how flicker bands may be produced by an oscillating light source, in accordance with some embodiments of the present disclosure.

When a scene that is captured by the image sensor(s) 102 includes a light source that changes in intensity over the time in which the light is captured—such as a 50 (Hertz) Hz or 60 Hz Alternating Current (AC) light source—some rows may be exposed to different intensities of the light than others. This disparity in light intensity can result in flicker banding, where the image includes alternating bands of lighter and darker regions, or other visual artifacts. Referring now to FIG. 2, FIG. 2 includes an example graph 200 used to illustrate how flicker bands may be produced by an oscillating light source, in accordance with some embodiments of the present disclosure.

In the graph 200, axis 210A may represent time and axis 210B may represent light brightness or intensity. Waveform 212 may correspond to an Alternating Current (AC)-powered light source. Row intensity 214A may represent the extent of integration of light for an individual row of the image sensor 102 over a period of time that the image sensor 102 is exposed to the light source(s). Row intensity 214B may represent the extent of integration of light for a different individual row of the image sensor 102 over the period of time that the image sensor 102 is exposed to the light source(s). As can be seen, the extent of the integration is different for the different rows due to the varying nature of the waveform 212 and different times at which the rows were exposed to the light source. This may manifest as flicker banding in an image captured using the image sensor 102, as indicated in FIG. 3A.

Figure 3A:
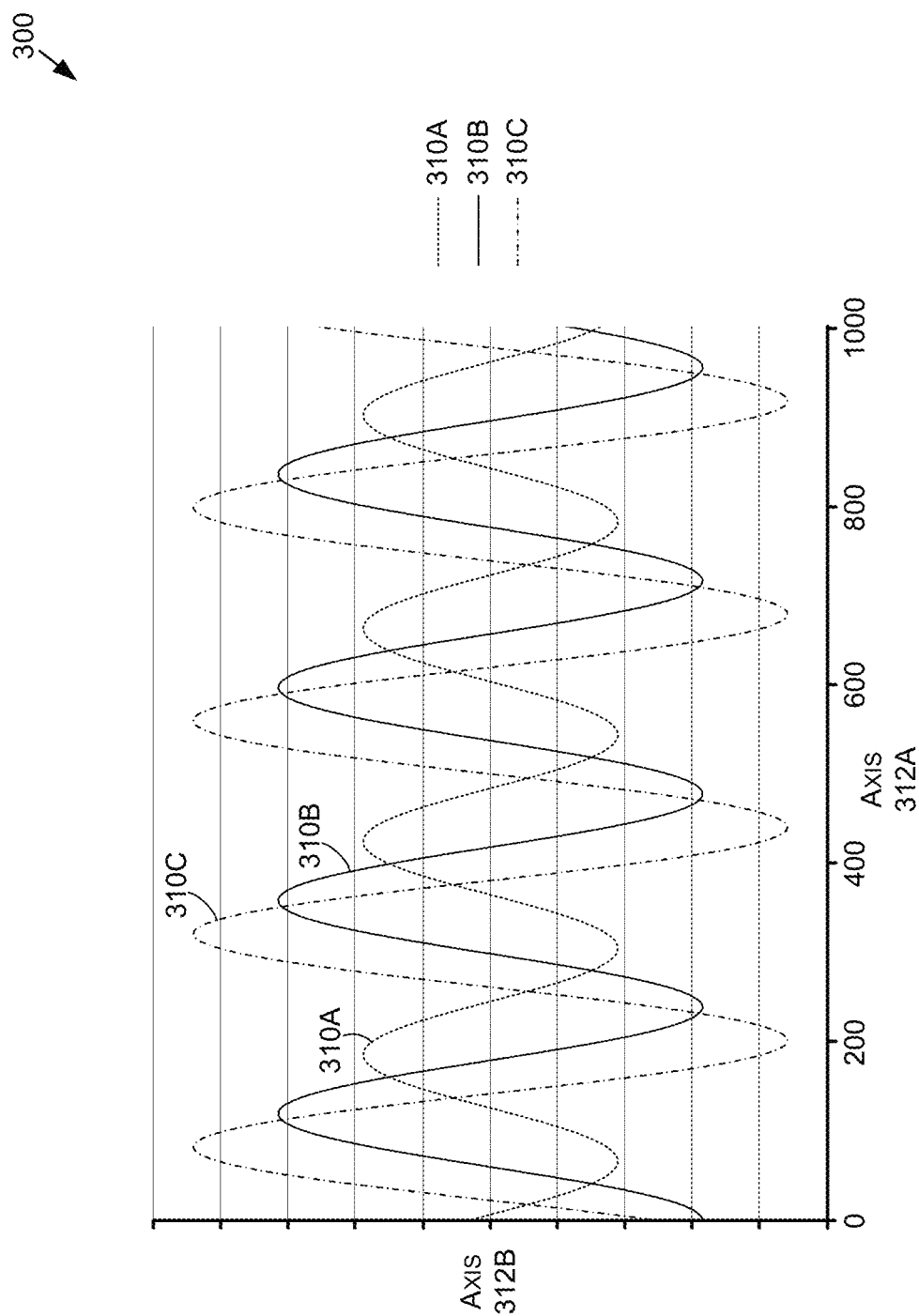
FIG. 3A is an example graph of waveforms of flicker bands, in accordance with some embodiments of the present disclosure.

Referring now to FIG. 3A, FIG. 3A is an example graph 300 of waveforms 310A, 310B, and 310C of flicker bands, in accordance with some embodiments of the present disclosure. In the graph 300, axis 312A may represent time and axis 312B may represent light brightness or intensity. Waveform 310A may correspond to flicker bands of the image 110A (e.g., a low exposure image), waveform 310B may correspond to flicker bands of the image 110B (e.g., a medium exposure image), and waveform 310C may correspond to flicker bands of the image 110C (e.g., a high exposure image).

The image analyzer 106 may be configured to analyze the images captured using the image sensor(s) 102, for example, to select one or more of the images for use in extracting flicker band data and/or for extracting flicker band data from the one or more images. For example, the image analyzer 106 may extract data representative of other otherwise corresponding to the flicker bands 112 from two or more of the images 110. The flicker bands 112 may be derived from at least a portion of flicker bands corresponding to the waveforms 310A, 310B, and/or 310C. For example, the flicker bands 112 may comprise an aggregation of flicker bands from one or more of the images 110, as described by way of example using FIG. 3B.

Figure 3B:
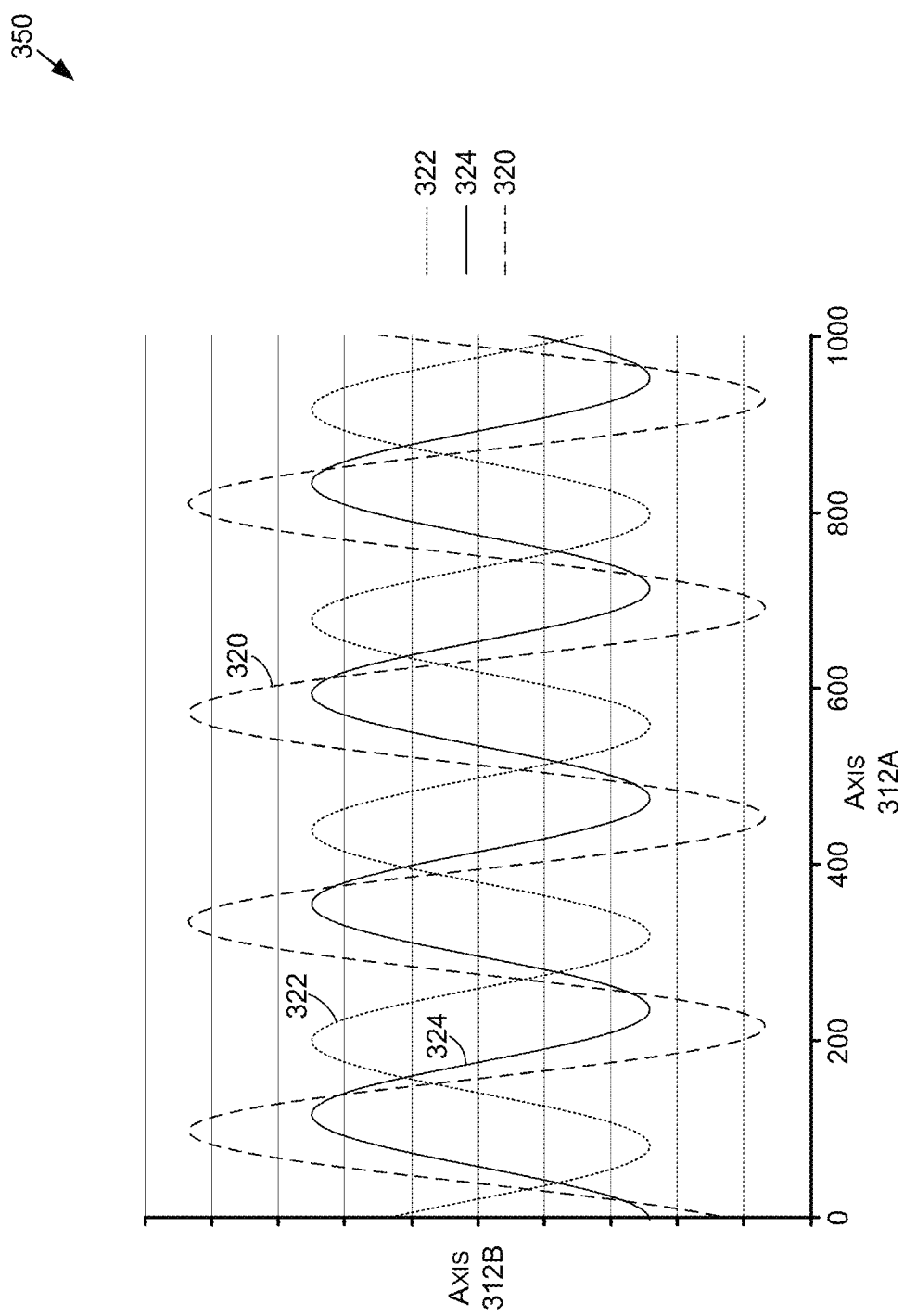
FIG. 3B is an example graph of waveforms of flicker bands and a flicker band that results from subtracting the flicker bands from each other, in accordance with some embodiments of the present disclosure.

Referring now to FIG. 3B, FIG. 3B is an example graph 350 of waveforms 322 and 324 of flicker bands and a waveform 320 of a flicker band that results from subtracting the flicker bands from each other, in accordance with some embodiments of the present disclosure. In FIG. 3B, the waveform 320 may comprise an aggregation of the waveforms 322 and 324. The waveform 320 may result from aggregating, subtracting, and/or otherwise combining at least some of the flicker bands that correspond to the waveforms 322 and 324. In at least one embodiment, prior to aggregating the waveforms 322 and 324, one or more of the waveforms may have been scaled in amplitude to result in what is shown in FIG. 3B (e.g., so that the waveforms have the same or substantially the same amplitudes).

Flicker bands of an image can be expressed mathematically as sin(x+p), where p may be the phase that reflects the actual location of a flicker band in a capture plane and x may be the frequency of the flicker bands. The subtraction of flicker bands for two images may then be expressed using equation (1):

$$A\sin(x+a) - A\sin(x+b) = 2A\sin\left(\frac{a-b}{2}\right)\cos\left(x+\frac{a+b}{2}\right) \quad (1)$$

where p=a for the flicker bands of one image and p=b for the flicker bands of another image. The flicker bands indicated by the waveforms 310A, 310B, and 310C may have different phases and/or amplitudes with respect to one another for different ones of the images 110. However, the Equation (1) indicates that subtraction of the flicker bands from one another may result in flicker bands (e.g., the flicker bands 112) that have the same frequency x as the other flicker bands, but a different amplitude and phase. As such, the frequency x of the waveform 320 may correspond to an oscillation frequency of the one or more light sources, and may be used by the configuration determiner 108 to determine a configuration that compensates for the oscillating nature of the one or more light sources. For example, the light intensity of a fluorescent lamps may be a sine wave but with a frequency that is twice the frequency of the current. Thus, for a 50 Hz power generator, the light may oscillate at 100 Hz, and for a 60 Hz generator, the light may oscillates at 120 Hz.

The image analyzer 106 may use any suitable approach for extracting flicker band data from the one or more images. By way of example and not limitation, at least portions of the images may be subtracted from one another (in some examples after downsampling or otherwise scaling the images) to produce image data that includes the flicker bands 112. For example, the image analyzer 106 may subtract channel information, pixel-by-pixel, from two selected stored images (and/or portions thereof) to generate a difference image. After subtracting the two images, the image analyzer 106 may perform an operation on each row of pixels in the difference image (in some examples after downsampling or otherwise scaling the difference image). For example, if the difference image (e.g., after downscaling) is 64 rows by 64 pixels, the image analyzer 106 may compute the sum of the 64 pixels in each row, resulting in 64 values, where each value is the sum of the pixel data for one of the 64 rows. As a further example, the image analyzer 106 may scale each of the row sums to smaller values, such as by scaling 16-bit sums into 12-bit values, resulting in 64 values, where each value is the scaled sum of the pixel data for one of the 64 rows. As a further example, the image analyzer 106 may compute the average pixel value over the 64 pixels in each row, resulting in 64 values, where each value is the average pixel value for one of the 64 rows. Note that computing the average pixel value over the 64 pixels in each row may be considered a special case of computing the scaled sum of the 64 pixels in each row. As a further example, the image analyzer 106 may perform the sum, scaled sum, or average function on downscaled images first, generating a 1×64 array for each stored image frame. As a further example, the image analyzer 106 may then subtract the 1×64 arrays corresponding to selected image frames.

The image analyzer 106 may then generate a one-dimensional (1D) Discrete-Cosine-Transform (DCT) of the difference values. The DCT may have any suitable number of bins, such as 32 or 64 bins, where the first bin represents the direct current (DC) component of the difference values, and each successive bin represents the energy at a frequency that is a consecutive power of two. For example, the first bin could represent the DC component, the second bin could represent the energy at 2 Hz, the third bin could represent the energy at 4 Hz, the fourth bin could represent the energy at 8 Hz, and so on. The image analyzer 106 may then compute a flicker band frequency of the flicker bands 112 from the DCT data (which may have been pre-processed).

As described herein, the images (e.g., any two of the images 110) used by the image analyzer 106 to extract flicker bands may be captured using exposures that at least partially overlap in time. Thus, scene content captured by each image is more likely to be similar, resulting in the flicker bands 112 being more readily distinguished from other image content. For example, in subtracting any two of the images 110 (or one or more images derived therefrom) from each other the scene content substantially cancels out, leaving behind the flicker bands 112 so that they may be more readily extracted by the image analyzer 106.

As described herein, in one or more embodiments, the image analyzer 106 may generally use at least two images that capture at least some of the same or similar content (e.g., the same real-world location(s)) and that are captured using the same or different image sensors. In embodiments where images include some different content, the image analyzer 106 may exclude and/or disregard corresponding regions of the images. Additionally, the image analyzer 106 may in some embodiments compensate for differences in real-world perspective and/or positions of one or more image sensors used to capture the images. Using these approaches may be suitable for embodiments that use different image sensors and/or cameras to capture the images. However, in various embodiments, the same image sensor and camera may be used to capture the images. For example, the images may be parts of a same frame captured by at least one sensor. In embodiments, the images (e.g., the images 110) may comprise multiple exposures that the at least one sensor captures in a frame.

In further contrast to traditional approaches to flicker band extraction, the images used to extract flicker bands may be captured using exposures that occur for different amounts of time. As a result, the flicker bands of each image are more likely to be out of phase, even where the images are captured over time periods that at least partially overlap. For example, under a rolling shutter scheme, pixels in the same row may be exposed at the same time, and pixels in different rows may be exposed at different time as the shutter rolls past the rows. If the width of the rolling shutter window is exposure time E, and the $i^{th}$ row of an image is exposed between time t and t+E, then the accumulative light that is integrated by that row F(t) may be expressed using equation (2):

$$F(t) = \int_t^{t+E} l(T)dT, \qquad (2)$$

where l(T) is the intensity of an oscillating light source. The intensity l(T) is directly proportional to power P that is in turn directly proportional to the square of the current. Thus, Equation (2) may be rewritten as Equation (3):

$$F(t) = \qquad (3)$$
$$\int_t^{t+E} \frac{P}{2}(1 - \cos(4\pi ft))dT = \frac{PE}{2} - \frac{P}{4\pi f}\sin(2\pi fE)\cos(4\pi ft + 2\pi fE).$$

This indicates that the integrated light is a sine wave with the same frequency as the light itself (twice that of the AC), causing flicker bands to appear as alternating dark and bright horizontal bands. Further, the term $\cos(4\pi ft+2\pi fE)$ indicates that the phase of images can be made different by using a different exposure time E for each image.

From the forgoing equations it can be seen that using exposure times, images may be adjusted so that flicker bands may be extracted from the images without cancelling out. Thus, in embodiments where the images are captured at different times (e.g., as part of different frames), by using different exposure times for the images, the image analyzer 106 may extract flicker band data therefrom, even where the capture times would otherwise cause the flicker bands to cancel out. Additionally, in embodiments where the images are captured at times that at least partially overlap, using different times for capturing the images allows for the flicker band data to be extracted therefrom. In one or more embodiments, the image capture manager 104 may be configured so that exposure times used to capture images used to determine flicker bands may be configured to avoid exposure times in which flicker bands would cancel out. For example, if the image capture manager 104 uses auto-exposure, the auto-exposure may be configured to avoid exposure times in which the flicker bands would cancel out.

Also, as the time t changes, the time dependent term in Equation (3) oscillates between −1 and 1. That makes the integrated light oscillate between points at $$\frac{PE}{2} - \frac{P}{4\pi f}\sin(2\pi fE).$$

and $$\frac{PE}{2} + \frac{P}{4\pi f}\sin(2\pi fE).$$

Thus, the visibility V(E) of the flicker bands is directly proportional to the difference between these two points, as expressed by Equation (4):

$$V(E) = \qquad (4)$$
$$\left(\frac{PE}{2} + \frac{P}{4\pi f}\sin(2\pi fE)\right) - \left(\frac{PE}{2} - \frac{P}{4\pi f}\sin(2\pi fE)\right) = \frac{P}{2\pi f}\sin(2\pi fE)$$

This shows that flicker correction may be performed by setting the exposure time to 1/2f or any positive integer multiple of 1/2f because $\sin(n\pi)=0$ for any positive integer n.

Also from the forgoing equations it can be seen that certain images when compared to one another may produce flicker band data that more clearly captures flicker bands. For example, given the images 110A, 110B, and 110C, flicker bands may be more clearly extracted using the images 110A and 110B as flicker bands between those images are more out of phase than flicker bands between the images 110A and 110C. In at least one embodiment, given a plurality of images, the image analyzer 106 may be configured to select the images that include flicker bands that are the most out of phase from one another, or would otherwise produce the most visible flicker bands. This, the image analyzer 106 may extract the flicker bands using the images 110A and 110B based at least on those images have flicker bands that are more out of phase with other another than the images 110A and 110C. For example, the image analyzer 106 may compute or otherwise determine a phase difference to select the images, or may be otherwise configured to select the images that have the most out of phase flicker bands for flicker band extraction.

As described herein, the configuration determiner 108 may be configured to determine a configuration(s) of at least one sensor, such as one or more of the image sensors 102 based on the flicker bands 112. For example, based on the oscillation frequency of the one or more light sources that is computed or otherwise indicated by the flicker band data, the configuration determiner 108 may determine a configuration that reduces, eliminates, or otherwise compensates for the oscillation frequency. In one or more embodiments, the configuration may define by such camera parameters as those that impact exposure time, frame rate, brightness, aperture, focal length, ISO speed, etc. In at least one embodiment, the configuration adjusts exposure time of a frame and/or one or more sub-images of a frame (e.g., low exposure image, high exposure image, medium exposure image, etc.) to reduce or eliminate flicker banding associated with an identified AC component(s) of the one or more light sources. Other camera parameters, such as the frame rate, may be maintained constant.

The image capture manager 104 (and/or a different image capture manager 104) may use the configuration(s) determined using the configuration determiner 108 to capture one or more images. For example, the image sensor(s) 102 that captured the images used for flicker band extraction may be used to capture the subsequent images with a configuration determined using the configuration determiner 108 and/or one or more other image sensors may be used to capture subsequent images. As an example, the image sensor(s) 102 may comprise a multi-exposure sensor, while an image sensor(s) that uses a configuration determined using the configuration determiner 108 may be a single exposure sensor that is not capable of multi-exposure, which is typically less expensive than a multi-exposure sensor. Additionally, or alternatively, one or more other multi-exposure sensors may use a configuration determined using the configuration determiner 108.

Figure 4:
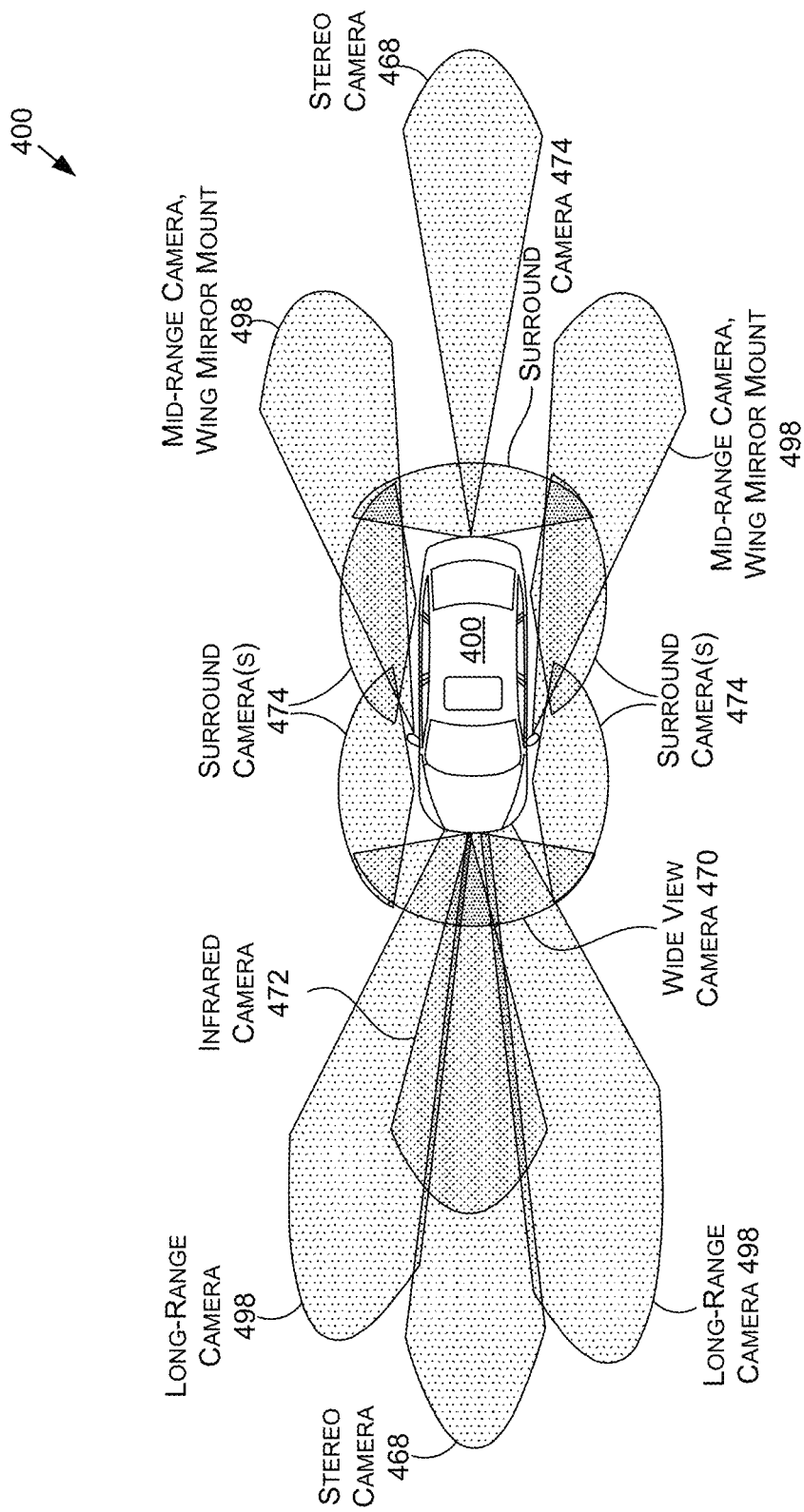
FIG. 4 is an example of camera locations and fields of view for an example autonomous vehicle, in accordance with some embodiments of the present disclosure.

For example, FIG. 4 is an example of camera locations and fields of view for an example autonomous vehicle 400, in accordance with some embodiments of the present disclosure. The autonomous vehicle 400 may include any number of cameras, such as a stereo camera(s) 468, a wide-view camera(s) 470 (e.g., fisheye cameras), an infrared camera(s) 472, a surround camera(s) 474 (e.g., 360 degree cameras), a long-range and/or mid-range camera(s) 498, and/or other camera types. Any combination of the cameras may be used to control autonomous driving and/or Advanced Driver Assistance Systems (ADAS) functions. Using disclosed approaches, images (e.g., used for flicker band extraction or generated based on flicker band extraction) as described herein may be generated using any combination of the cameras of the autonomous vehicle 400. For example, a camera(s) used for flicker band extraction may comprise a multi-exposure sensor(s) to leverage embodiments that use images for a single frame in extracting flicker bands. Then, any combination of the cameras may benefit from the flicker band extraction, even where a camera does not support multi-exposure, or even where the camera is configured in a manner that is less suitable for flicker band extraction. While the autonomous vehicle 400 is shown, similar approaches may be used for other types of machines (e.g., robots) or environments that include multiple cameras.

Each block of each method described herein comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, methods are described, by way of example, with respect to the system 100 of FIG. 1. However, the methods may additionally or alternatively be executed by any one system, or any combination of systems, including, but not limited to, those described herein.

Figure 5:
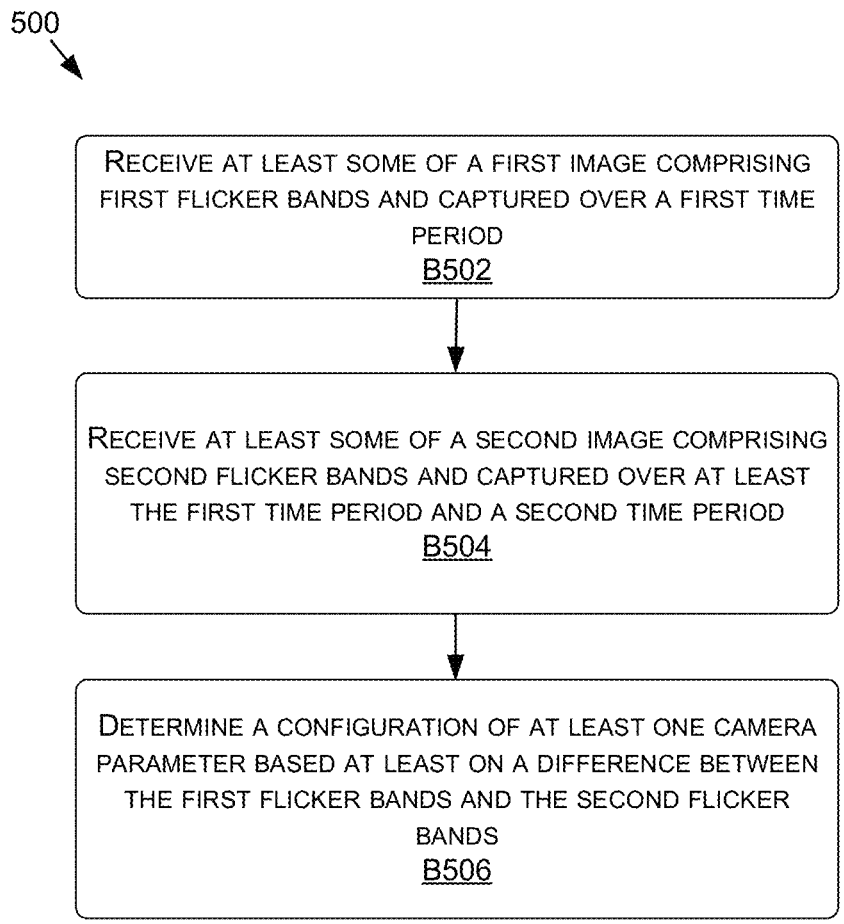
FIG. 5 is a flow diagram showing a method for compensating for flicker bands using images captured over a shared time period, in accordance with some embodiments of the present disclosure.

Referring now to FIG. 5, FIG. 5 is a flow diagram showing a method 500 for compensating for flicker bands using images captured over a shared time period, in accordance with some embodiments of the present disclosure. The method 500 includes, at block B502, receiving at least a portion of a first image comprising first flicker bands and captured over a first time period. For example, the image analyzer 106 may receive first image data from the image sensor 102 exposed to one or more light sources over a first time period. The first image data may be representative of at least some of the image 110A of a frame, where the image 110A includes flicker bands corresponding to the waveform 310A.

The method 500 includes, at block B504, receiving at least a portion of a second image comprising second flicker bands and captured over at least the first time period and a second time period. For example, the image analyzer 106 may receive second image data from the image sensor 102 exposed to the one or more light sources over at least the first time period and the second time period. The second image data may be representative of at least some of the image 110B of the frame (or the image 110C in other examples), where the image 110B includes flicker bands corresponding to the waveform 310B.

The method 500 includes, at block B506, determining a configuration of at least one camera parameter based at least on a difference between the first flicker bands and the second flicker bands. For example, the image analyzer 106 may compute a difference between the first flicker bands and the second flicker bands using the first image data and the second image data. The configuration determiner 108 may determine a configuration of at least one camera parameter based at least on the difference. The at least one camera parameter may be applied to the image sensor 102 and/or one or more other image sensors to capture one or more images.

Figure 6:
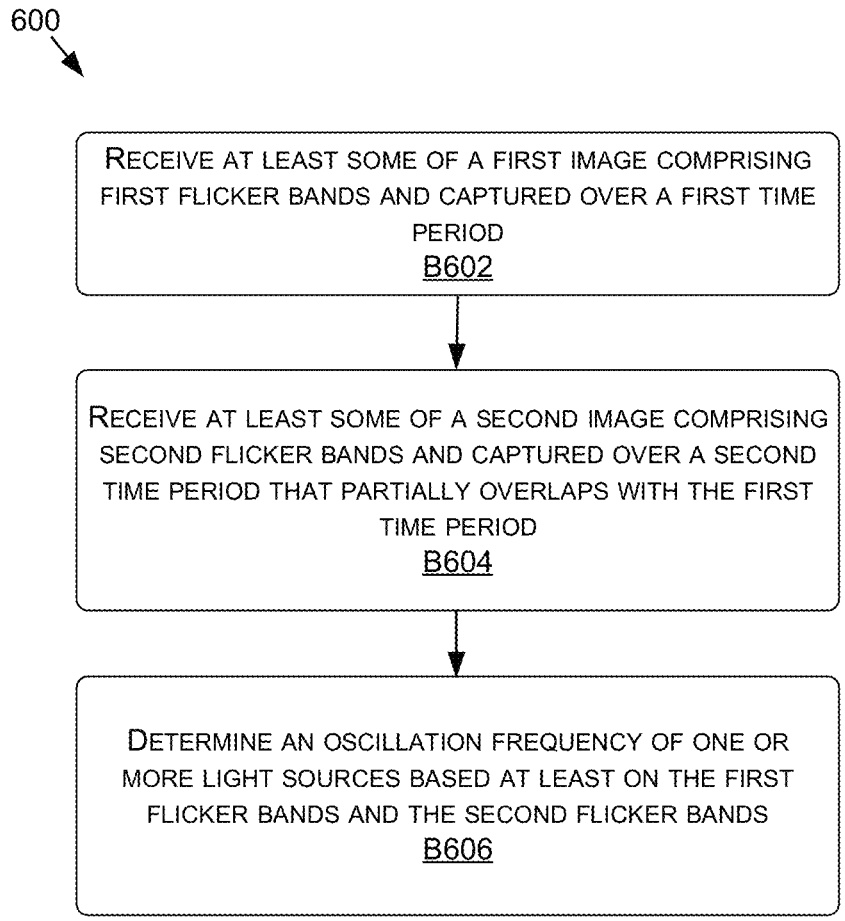
FIG. 6 is a flow diagram showing a method for compensating for flicker bands using images captured over partially overlapping time periods, in accordance with some embodiments of the present disclosure.

Referring now to FIG. 6, FIG. 6 is a flow diagram showing a method 600 for compensating for flicker bands using images captured over partially overlapping time periods, in accordance with some embodiments of the present disclosure. The method 600 includes, at block B602, receive at least some of a first image comprising first flicker bands and captured over a first time period. For example, the image analyzer 106 may receive first image data representative of at least some of the image 110A captured using a first exposure to one or more light sources over a first time period. The image 110A includes flicker bands corresponding to the waveform 310A produced by the one or more light sources.

The method 600 includes, at block B604, receiving at least a portion of a second image comprising second flicker bands and captured over at least the first time period that partially overlaps with the first time period. For example, the image analyzer 106 may receive second image data from the image sensor 102 exposed to the one or more light sources over a second time period that at least partially overlaps with the first time period. The second image data may be representative of at least some of the image 110B of the frame (or the image 110C in other examples), where the image 110B includes flicker bands corresponding to the waveform 310B.

The method 600 includes, at block B606, determining an oscillation frequency of one or more light sources based at least on the first flicker bands and the second flicker bands. For example, the image analyzer 106 may determine, using the first image data and the second image data, an oscillation frequency of the one or more light sources (e.g., of the waveform 320) based at least on the first flicker bands and the second flicker bands. The image analyzer 106 may further transmit data that causes configuration of at least one sensor based at least on the oscillation frequency. For example, data representative of the oscillation frequency may be provided to the configuration determiner 108 for use in configuring the at least one sensor (e.g., the image sensor 102).

Figure 7:
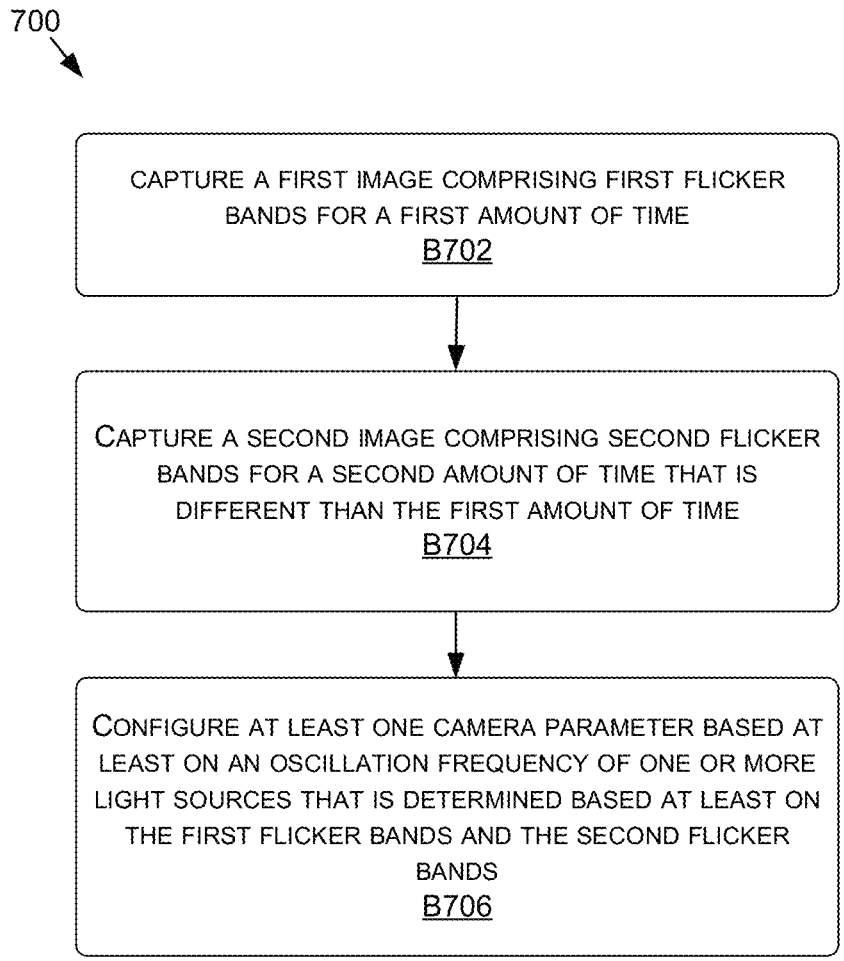
FIG. 7 is a flow diagram showing a method for compensating for flicker bands using images captured for different amounts of time, in accordance with some embodiments of the present disclosure.

Referring now to FIG. 7, FIG. 7 is a flow diagram showing a method 700 for compensating for flicker bands using images captured for different amounts of time, in accordance with some embodiments of the present disclosure. The method 700, at block B702 includes capturing a first image comprising first flicker bands for a first amount of time. For example, the image capture manager 104 may use the image sensor 102 to capture the image 110A using a first exposure to one or more light sources for a first amount of time. The image 110A may comprise flicker bands produced by the one or more light sources and corresponding to the waveform 310A.

The method 700, at block B704 includes capturing a second image comprising second flicker bands for a second amount of time that is different than the first amount of time. For example, the image capture manager 104 may use the image sensor 102 to capture the image 110B (or 110C) using a second exposure to the one or more light sources for a second amount of time that is different than the first amount of time. The image 110B may comprise flicker bands produced by the one or more light sources and corresponding to the waveform 310B.

The method 700, at block B706 includes configuring at least one camera parameter based at least on an oscillation frequency of one or more light sources that is determined based at least on the first flicker bands and the second flicker bands. For example, the image capture manager 104 (or a different image capture manager) may configure at least one camera parameter based at least on an oscillation frequency of the one or more light sources that is determined based at least on the flicker bands of the image 110A and the flicker bands of the image 110B.

Example Computing Device

Figure 8:
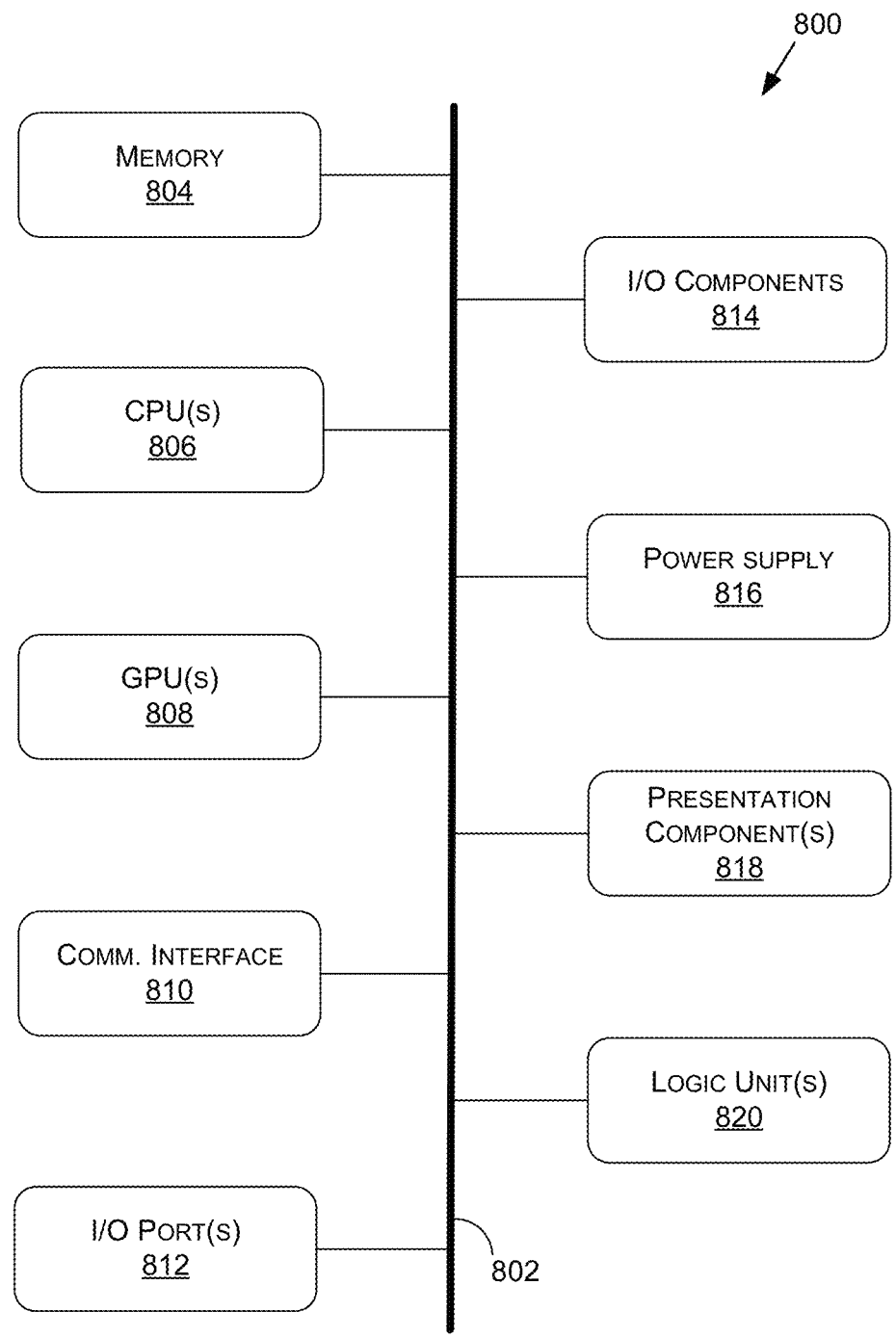
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

Example Data Center

Figure 9:
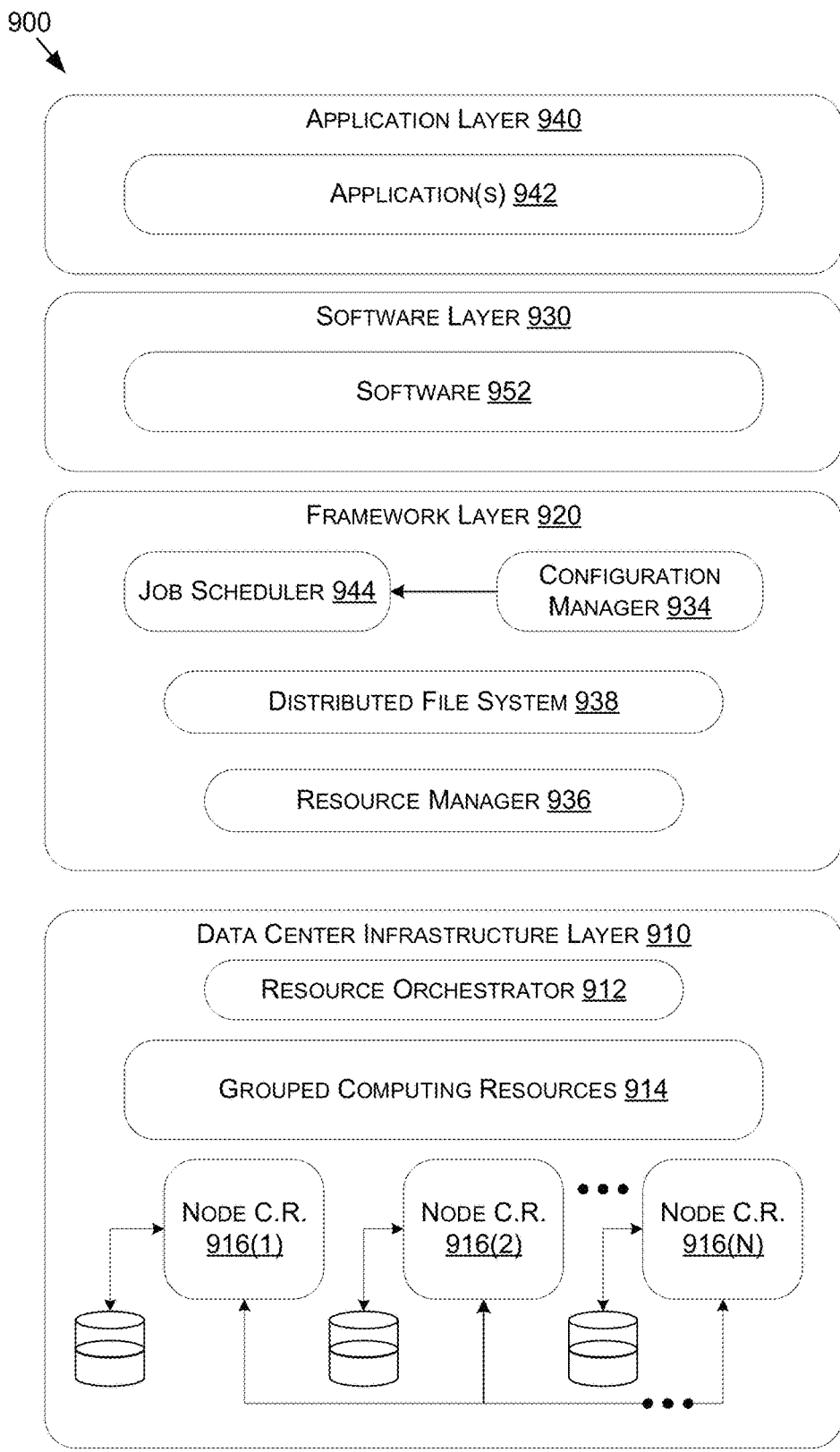
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, and/or other processors may be grouped within one or more racks to provide compute resources to support one or more workloads. The one or more racks may also include any number of power modules, cooling modules, and/or network switches, in any combination.

The resource orchestrator 922 may configure or otherwise control one or more node C.R.s 916(1)-916(N) and/or grouped computing resources 914. In at least one embodiment, resource orchestrator 922 may include a software design infrastructure (SDI) management entity for the data center 900. The resource orchestrator 922 may include hardware, software, or some combination thereof.

In at least one embodiment, as shown in FIG. 9, framework layer 920 may include a job scheduler 932, a configuration manager 934, a resource manager 936, and/or a distributed file system 938. The framework layer 920 may include a framework to support software 952 of software layer 930 and/or one or more application(s) 942 of application layer 940. The software 952 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. The resource manager 1036 may coordinate with resource orchestrator 912 to manage these mapped or allocated computing resources.

In at least one embodiment, software 952 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving first image data from one or more HDR sensors exposed to one or more light sources over a first time period, the first image data representative of at least some of a first image comprising first flicker bands produced by the one or more light sources;
   receiving second image data from the HDR sensors exposed to the one or more light sources over at least the first time period and a second time period that follows the first time period, the second image data representative of at least some of a second image comprising second flicker bands produced by the one or more light sources; and
   determining a configuration of at least one camera parameter using the first image data and the second image data based at least on a first phase difference between the first flicker bands and the second flicker bands being greater than a second phase difference between the first flicker bands and third flicker bands of a third image that was captured using the one or more HDR sensors.

2. The method of claim 1, wherein the at least one camera parameter comprises an exposure time that is used to capture one or more images and the exposure time is a multiple of one-half an oscillation frequency that corresponds to the one or more light sources.

3. The method of claim 1, wherein the first image and the second image are captured using exposure times that share a common start time.

4. The method of claim 1, wherein the determining of the configuration includes computing a difference between the first flicker bands and the second flicker bands using the first image data and the second image data.

5. The method of claim 1, wherein the determining of the configuration includes determining an oscillation frequency of the one or more light sources, and the at least one camera parameter is based at least on the oscillation frequency.

6. The method of claim 1, wherein the at least one camera parameter is of the one or more HDR sensors.

7. The method of claim 1, wherein the at least one camera parameter is of one or more single-exposure sensors.

8. The method of claim 1, wherein the configuration computed based at least on subtracting the first flicker bands and the second flicker bands from each other.

9. A system comprising:
   one or more processing units;
   one or more memory devices storing instructions, that when executed using the one or more processing units, cause the one or more processing units to execute operations comprising:
      receiving first image data representative of at least some of a first image captured using a first exposure to one or more light sources over a first time period, the first image comprising first flicker bands produced by the one or more light sources;
      receiving second image data representative of at least some of a second image captured using a second exposure to the one or more light sources over a second time period that partially overlaps with the first time period, the second image comprising second flicker bands produced by the one or more light sources;
      determining, using the first image data and the second image data, an oscillation frequency of the one or more light sources based at least on a first phase difference between the first flicker bands and the second flicker bands being greater than a second phase difference between the first flicker bands and third flicker bands of a third image, the third flicker bands produced by the one or more light sources; and
      transmitting data that causes configuration of at least one sensor based at least on the oscillation frequency.

10. The system of claim 9, wherein the first image and the second image are of a same frame captured by one or more multi-exposure sensors.

11. The system of claim 9, wherein the first image is captured using a first sensor and the second image is captured using a second sensor.

12. The system of claim 9, wherein the configuration is of an exposure time that the at least one sensor uses to capture one or more images.

13. The system of claim 9, wherein the first image and the second image are captured using exposure times that share a common start time.

14. The system of claim 9, wherein the determining of the oscillation frequency comprises computing a difference between the first flicker bands and the second flicker bands.

15. The system of claim 9, wherein the system is comprised in at least one of:
   a control system for an autonomous or semi-autonomous machine;
   a perception system for an autonomous or semi-autonomous machine;
   a system for performing simulation operations;
   a system for performing deep learning operations;
   a system implemented using an edge device;
   a system implemented using a robot;
   a system incorporating one or more virtual machines (VMs);
   a system implemented at least partially in a data center; or
   a system implemented at least partially using cloud computing resources.

16. A processor comprising:
one or more circuits to capture a first image using a first exposure to one or more light sources for a first amount of time, the first image comprising first flicker bands produced by the one or more light sources, capture a second image using a second exposure to the one or more light sources for a second amount of time that is different than the first amount of time, the second image comprising second flicker bands produced by the one or more light sources, compute a difference using the first image and the second image based at least on a first phase difference between the first flicker bands and the second flicker bands being greater than a second phase difference between the first flicker bands and third flicker bands of a third image, and configure at least one camera parameter based at least on the difference.

17. The processor of claim 16, wherein the first image and the second image are of a same frame captured by one or more multi-exposure sensors of a camera device.

18. The processor of claim 16, wherein the first image and the second image are captured using exposure times that share a common start time.

19. The processor of claim 16, wherein the first exposure is for a first time period that occurs within a second time period for the second exposure.

20. The processor of claim 16, wherein the one or more circuits are of a camera device.

* * * * *